UNITED STATES PATENT OFFICE.

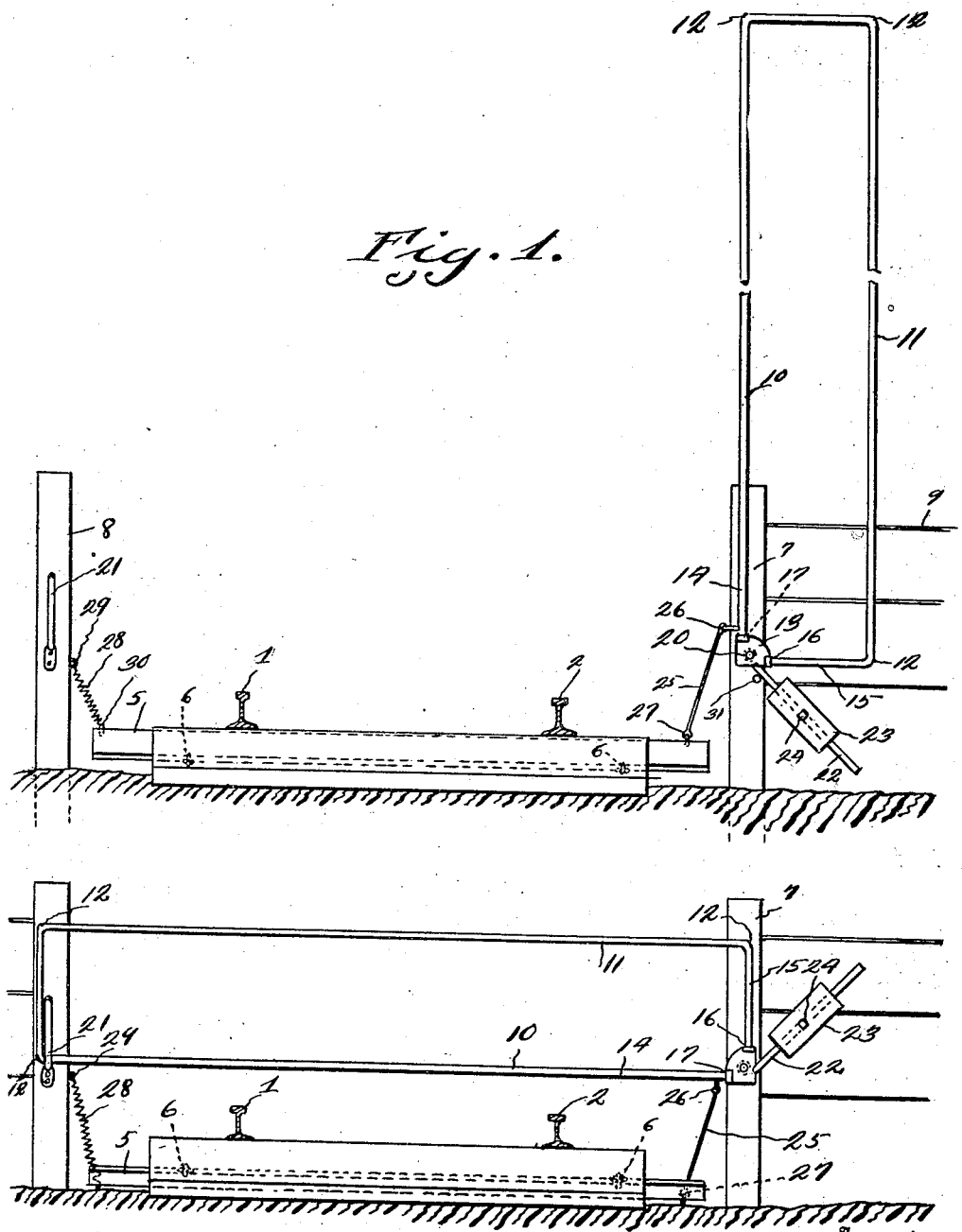

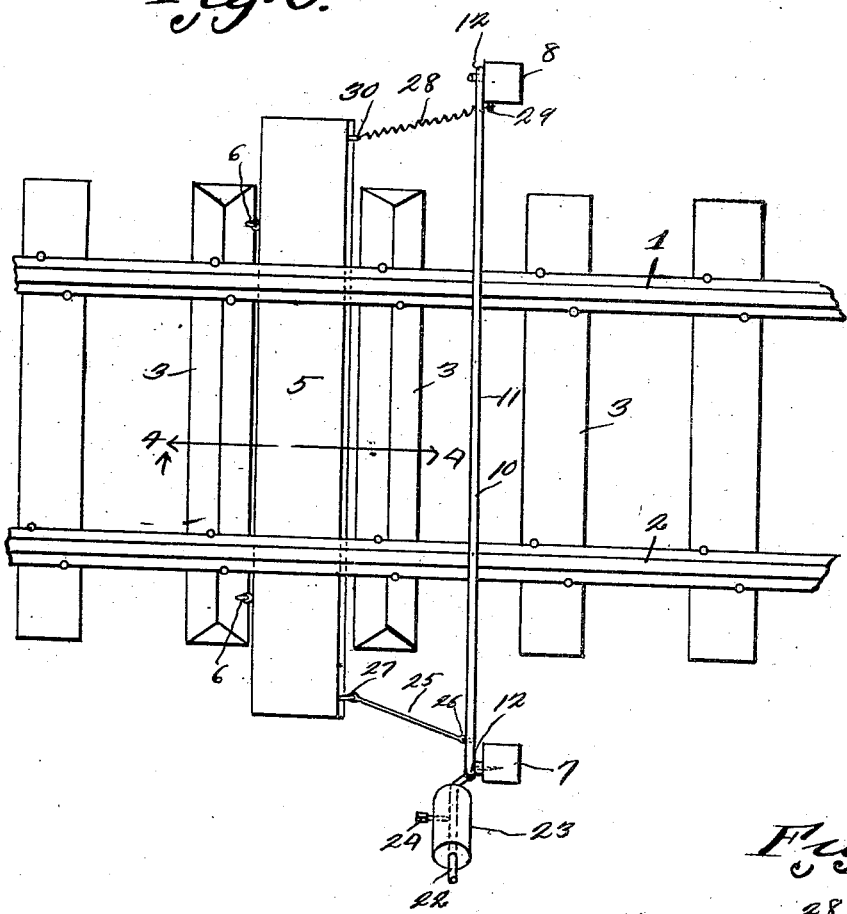

LERT McCONNELL, OF GRAND RIVER, IOWA.

CATTLE-GUARD.

1,312,793.   Specification of Letters Patent.   Patented Aug. 12, 1919.

Application filed July 31, 1918. Serial No. 247,519.

*To all whom it may concern:*

Be it known that I, LERT MCCONNELL, a citizen of the United States, residing at Grand River, in the county of Decatur, State of Iowa, have invented a new and useful Cattle-Guard; and I do hereby declare the following to be a full, clear, and exact description of the invention, such as will enable others skilled in the art to which it appertains to make and use the same.

This invention relates to an improved railroad cattle guard or cattle gate, and an object of the invention consists in the provision of means adapted to be actuated by the animal, for raising and lowering the gate on its fulcrum.

A further object of the invention consists in the provision of depressible means between the ties of the railroad under spring tension and adapted to be depressed by the animal, and connections between the means and a pivoted cattle gate or guard (which is supported normally raised by gravity means) for moving the gate pivotally downwardly to a closed position.

A further object of the invention is to provide limiting means to limit the gate in its normal raised position, when returned to said position by the gravity means.

In practical fields the details of construction may necessitate alterations falling within the scope of what is claimed.

The invention comprises further features and combination of parts as hereinafter set forth, shown in the drawings and claimed.

In the drawings:—

Figure 1 is a cross sectional view through a portion of a railroad, showing the cattle gate or guard as applied, the gate or guard being raised.

Fig. 2 is a similar view, showing the gate in elevation and in a lowered position.

Fig. 3 is a top plan view of Fig. 2.

Fig. 4 is a detail sectional view on line 4—4 of Fig. 3.

Fig. 5 is a detail view of the pivoted corner of the cattle gate or guard.

Referring more especially to the drawings, 1 and 2 designate the rails and 3 the ties, two of which are V-shaped in cross section as indicated at 4. A depressible platform 5 is hingedly connected by interengaging eyes 6 to one of the ties, as clearly shown in the drawings. This platform is disposed between the V-shaped ties, so that should the animal step upon either of the adjacent faces of the V-shaped ties the foot of the animal will contact with the platform and depress the same. Suitable fence posts 7 and 8 are provided, one upon each side of the rails, and the usual wire fence 9 is connected to the post 7. A cattle guard or gate 10 is provided and consists of the tubular frame 11. This frame is constructed from tubular material, bent as at 12, to form the rectangular shape as shown in Fig. 1 and 2. A coupling plate 13 is provided for connecting the adjacent ends of the longitudinal and end parts 14 and 15. These parts 14 and 15 have their adjacent ends secured in any suitable manner in the sockets 16 and 17 of the coupling plate 13. This coupling plate 13 has an opening and an adjoining boss 18, the opening 19 passing through said boss. The opening 19 is designed to receive a pivot pin 20, which is carried by the post 7, whereby the cattle guard or gate is pivotally mounted, in order to swing downwardly and over the rails, as shown clearly in Fig. 2. When the cattle guard or gate swings downwardly to the position shown in Fig. 2 it engages and rests in the angle support 21, which is carried by the post 8. The coupling plate 13 has an arm 22, which, when the gate or guard is lowered extends laterally and upwardly on substantially a 45 degree angle, there being a weight 23 secured by a set screw 24 on said arm. By means of this weight or gravity member, the cattle guard or gate is restored to its normal position vertically as shown in Fig. 1. A link 25 connects between the eyes 26 and 27 (which are carried respectively by the gate or guard and the depressible platform 5) so that when the platform 5 is depressed downwardly the gate or guard will be lowered to the position shown in Fig. 2, against the gravity of the weight 23. A spring 28 is connected between the eyes 29 and 30 of the post 8 and the platform 5 respectively, so that when pressure is relieved on the platform, the platform will return to its normal raised position, and by virtue of the weight, the gate or guard would be moved to a vertical position. When the gate is moved to the vertical position the arm 22 will contact with the limiting pin 31, which is carried by the post 7, so as to limit the gate to its position as illustrated in Fig. 1 of the drawings.

The invention having been set forth what is claimed as new and useful is:—

A cattle guard comprising a foot treadle having one of its edges hingedly connected to a side of a tie of a railroad and adapted to pivot between adjacent ties, a spring tensioning means connected to one end of the foot treadle at its free end and having its other end connected to a post beside the roadbed whereby the free edge of the foot treadle is kept normally in contact with the bases of the track rails, a post located beside the roadbed and opposite the spring holding post and having a guard gate pivoted thereto, said guard gate beng pivoted at one of its corners to the post and having a weighted arm extending from said corner adapted to engage a stop when the guard gate is in raised position, said stop being located below the pivotal point of the guard gate and a connection between the gate at a point above the pivotal point thereof and the free edge of the foot treadle whereby the guard gate will be pulled to a closed position upon depression of the free edge of the foot treadle.

In testimony whereof I have signed my name to this specification in the presence of two subscribing witnesses.

LERT McCONNELL.

Witnesses:
H. ROSENGRANT,
E. KYLE.